United States Patent [19]
Thibodeau

[11] Patent Number: 5,851,028
[45] Date of Patent: Dec. 22, 1998

[54] INFLATOR WITH FLOW DIVERTER AND HEAT SINK

[75] Inventor: Robert L. Thibodeau, Knoxville, Tenn.

[73] Assignee: Bendix-Atlantic Inflator Company, Knoxville, Tenn.

[21] Appl. No.: 771,078

[22] Filed: Dec. 20, 1996

[51] Int. Cl.[6] .................................................. B60R 21/26
[52] U.S. Cl. ......................... 280/736; 280/741; 280/742
[58] Field of Search ................................... 280/736, 741, 280/742

[56] References Cited

U.S. PATENT DOCUMENTS

| 5,503,806 | 4/1996 | Fulmer et al. | 422/164 |
| 5,525,306 | 6/1996 | Schmucker et al. | 422/165 |
| 5,551,725 | 9/1996 | Ludwig | 280/737 |
| 5,625,164 | 4/1997 | McFarland et al. | 102/531 |
| 5,634,661 | 6/1997 | Dahl et al. | 280/741 |
| 5,645,296 | 7/1997 | Okada et al. | 280/736 |

FOREIGN PATENT DOCUMENTS

2 233 202  1/1975  France .

*Primary Examiner*—J. Woodrow Eldred
*Attorney, Agent, or Firm*—Sixbey, Friedman Leedom & Ferguson; Frank P. Presta; Joseph S. Presta

[57] ABSTRACT

An inflator (20) having a body (22) including a first combustion chamber (110) and a second combustion chamber (112) and a plurality of exit orifices (90); a quantity of first propellant (150) within the first combustion chamber and a quantity of second propellant (180) within the second combustion chamber (112), the second propellant producing inflation gas as it combusts; a separator (100) from the first combustion chamber into the second combustion chamber; the body (22) proximate the second combustion chamber (112) including a plurality of control orifices (90); a flow means (70) for causing inflation gas exiting the control orifices to flow through an arcuate path between the control orifices and the exit orifices (30); a heat sink (230) and (234) for changing the physical state of at least one gaseous component of the inflation gas to a liquid and a solid prior to this component exiting the exit orifices.

11 Claims, 8 Drawing Sheets

INFLATOR WITH FLOW DIVERTER AND HEAT SINK

BACKGROUND AND SUMMARY OF THE INVENTION

The present invention generally relates to an inflator or gas generator for inflating an air bag.

It is an object of the present invention to provide an inflator having improved gas flow and gas generation techniques.

Accordingly the invention comprises: an inflator (20) having a body (22) including a first combustion chamber (110) and a second combustion chamber (112) and a plurality of exit orifices (90); a quantity of first propellant (150) within the first combustion chamber and a quantity of second propellant (180) with the second combustion chamber (112), the second propellant producing inflation gas as it combusts; separating means (100) for separating the first and second combustion chambers and for directing products of combustion produced upon the burning of the first propellant radially into the second combustion chamber; the body (22) proximate the second combustion chamber (112) including a plurality of control orifices (90); flow diverter means (70) for causing inflation gas exiting the control orifices to flow through an arcuate path between the control orifices and the exit orifices (30); heat sink means (230) and (234) for changing the physical state of at least one gaseous component of the inflation gas to a liquid and a solid prior to this component exiting the exit orifices.

Many other objects and purposes of the invention will be clear from the following detailed description of the drawings.

DETAILED DESCRIPTION OF THE DRAWINGS

Reference is made to FIGS. 1–8 which illustrate an inflator or gas generator 20 having a body 22 comprising a circular base plate 24 having a mounting flange 26 extending therefrom. The flange 26 includes a plurality of mounting holes 28 to permit the inflator to be mounted to a cooperating structure such as the hub of a steering wheel. The inflator 20 further includes a cylindrical diffuser 40 having a top portion 42 with opening 44 therein to reduce the weight, a side wall 46 having a plurality of exit openings 48 disposed about the periphery of the side wall. Typically eight (8) to thirty (30) exit openings are utilized to provide a gas flow area that is sufficiently large so as not to impede the flow of inflation gas exiting the inflator 20. The lower portion of the wall 46, generally shown as 50, is secured such as by welding (see welds 52a and 52b) to the flange 26. The diffuser 40 includes a stepped exterior contour generally shown as 60 defining a first shoulder 62 and second shoulder 64.

Figure 3:
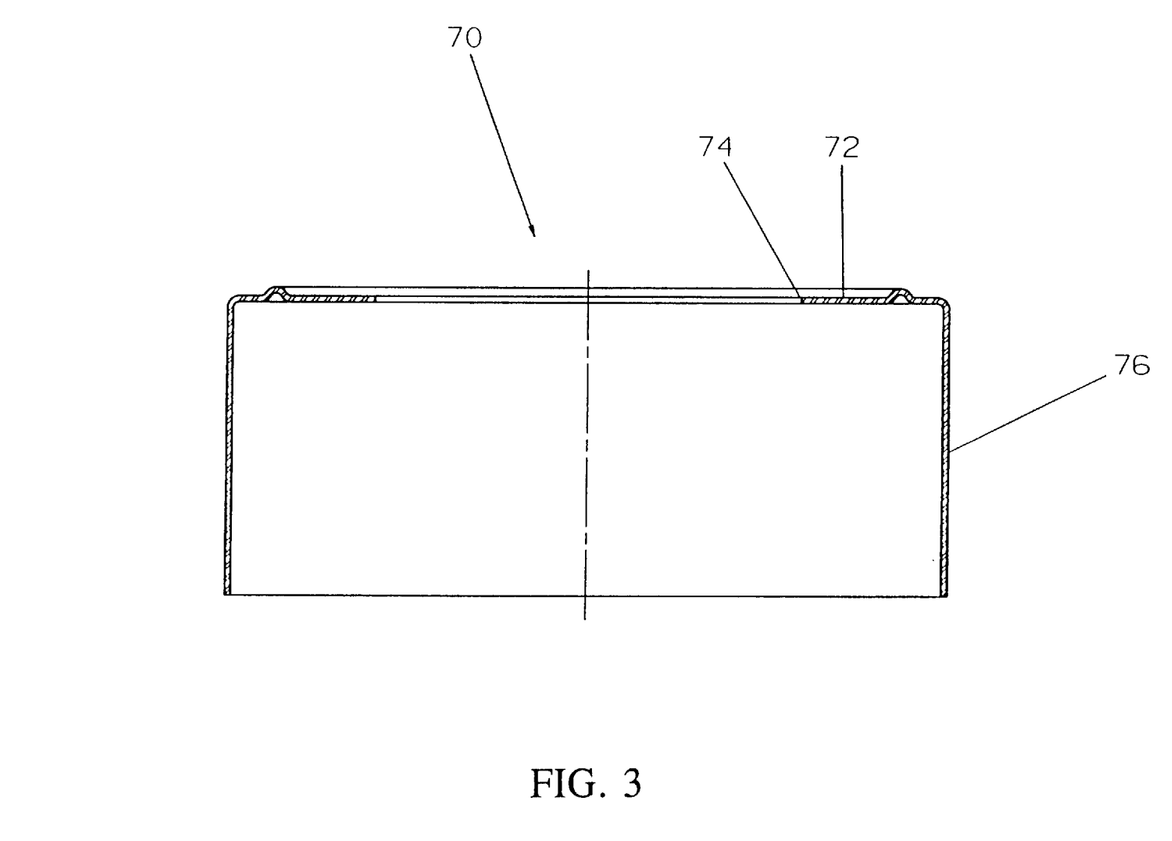
FIG. 3 illustrates a cross-sectional view of a flow diverter.

The inflator 20 further includes a flow diverter 70. The flow diverter is generally cup-shaped, having a top 72 with a large opening 74 therein and a wall 76 extending downwardly from the top 72. A corner 78 between the top 72 and the wall 76 is nestled against the circumferential shoulder 62. The above construction defines an annular space 78a between the wall 76 of the flow diverter 70 and the side wall 84 of the housing member within which an annular element 230 is received shown in FIG. 10.

Figure 4:
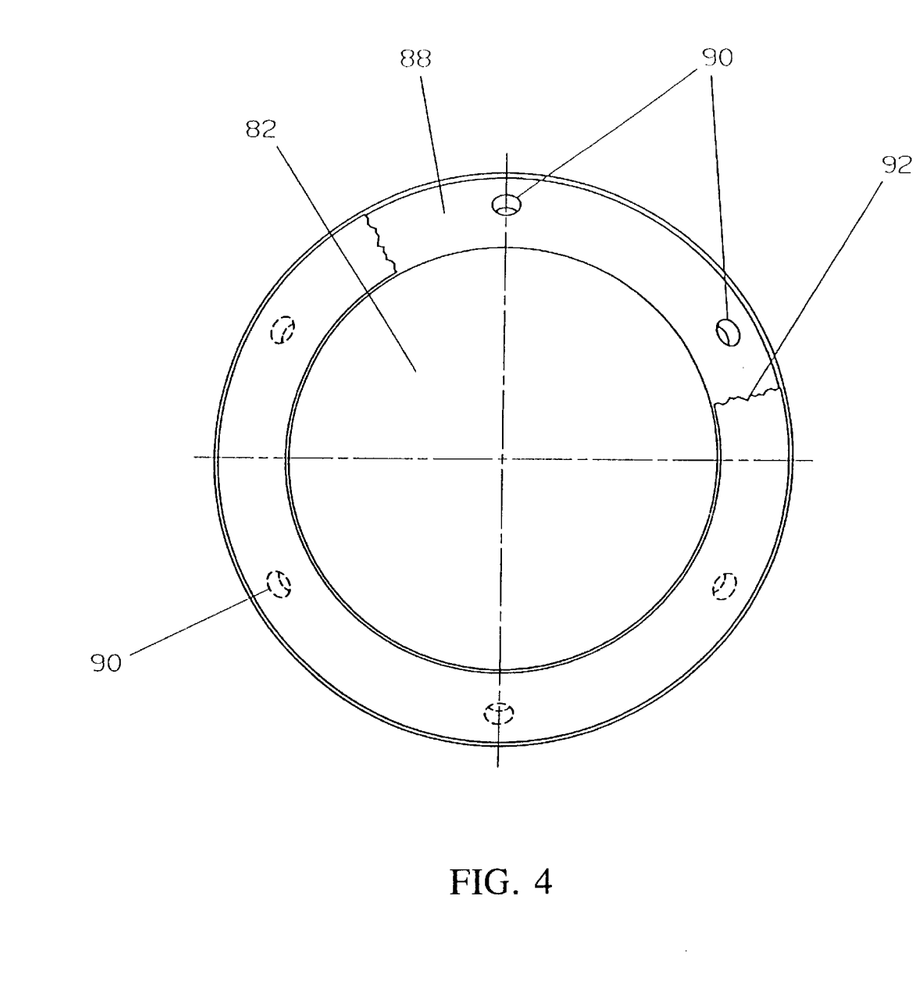
FIG. 4 is a top plan view of an upper housing member showing a portion of an upper housing.

Situated on the base 24 and forming a portion of the body 22 is an upper housing member generally shown as 80. This housing member is cup-shaped having a top 82, a depending side wall 84 having a generally axially extending wall portion 86 and an angled wall portion 88. The angled wall portion includes a plurality of nozzles 90. The angled wall is oriented at about forty-five (45) degrees. The nozzles 90 act as control nozzles or orifices by providing a controlled restriction to the flow of inflation gas thereby controlling the pressure build-up within the inflator 20 as described below.

Each of the nozzles 90 is covered by a protective foil 92 such as a thin aluminum foil that may be adhesively bonded to the exterior of the housing 80. The lower portion 94 of the wall 84 is secured such as by welding (see weld 96) to the base plate 24. Secured between the base plate 24 and the upper housing member 80 is a cylindrical tube 100 having a plurality of flow passages 102 extending laterally therethrough. The tube 100 is secured such as by welding (see welds 104 and 106) to the upper housing member 82 and the base plate 24 respectively. The volume generally designated as 110, interior to the tube, defines a first combustion chamber. The annular volume between the tube and the wall 84 defines a second combustion chamber generally designated as 112. The welds 104, 106 and 96 may be accomplished by friction welding the base plate 24 to the ends of the wall 84 and to the ends of the tube 100. As can be seen from the above, the top 72 of the flow diverter 70 is sandwiched between the top 82 of the upper housing member 80 and the top 42 of the diffuser. If desired, an optional weld such as 120 may be used to secure the flow diverter in place. An additional weld 122 is provided to secure the top of the diffuser to the upper housing member 80. As can be seen from FIG. 1, the bottom 79 of the flow diverter 70 is spaced (space 81) from the plate 24. This space 81 is provided to permit the inflation gas flowing down the wall of the flow diverter to be able to change direction and then exit the openings 30.

Figure 1:
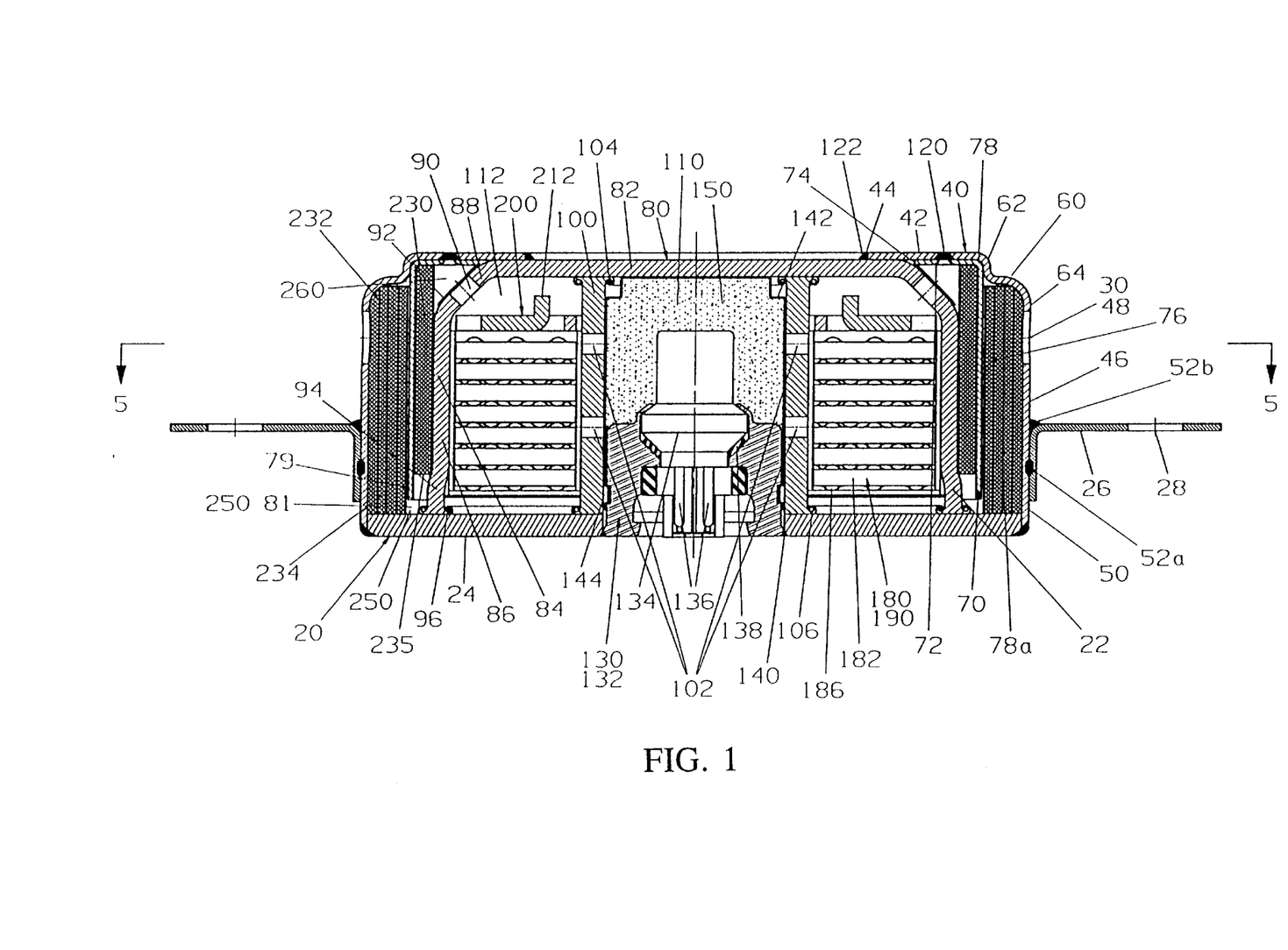
FIG. 1 is a cross-sectional view of an inflator constructed in accordance with the present invention.
Figure 2:
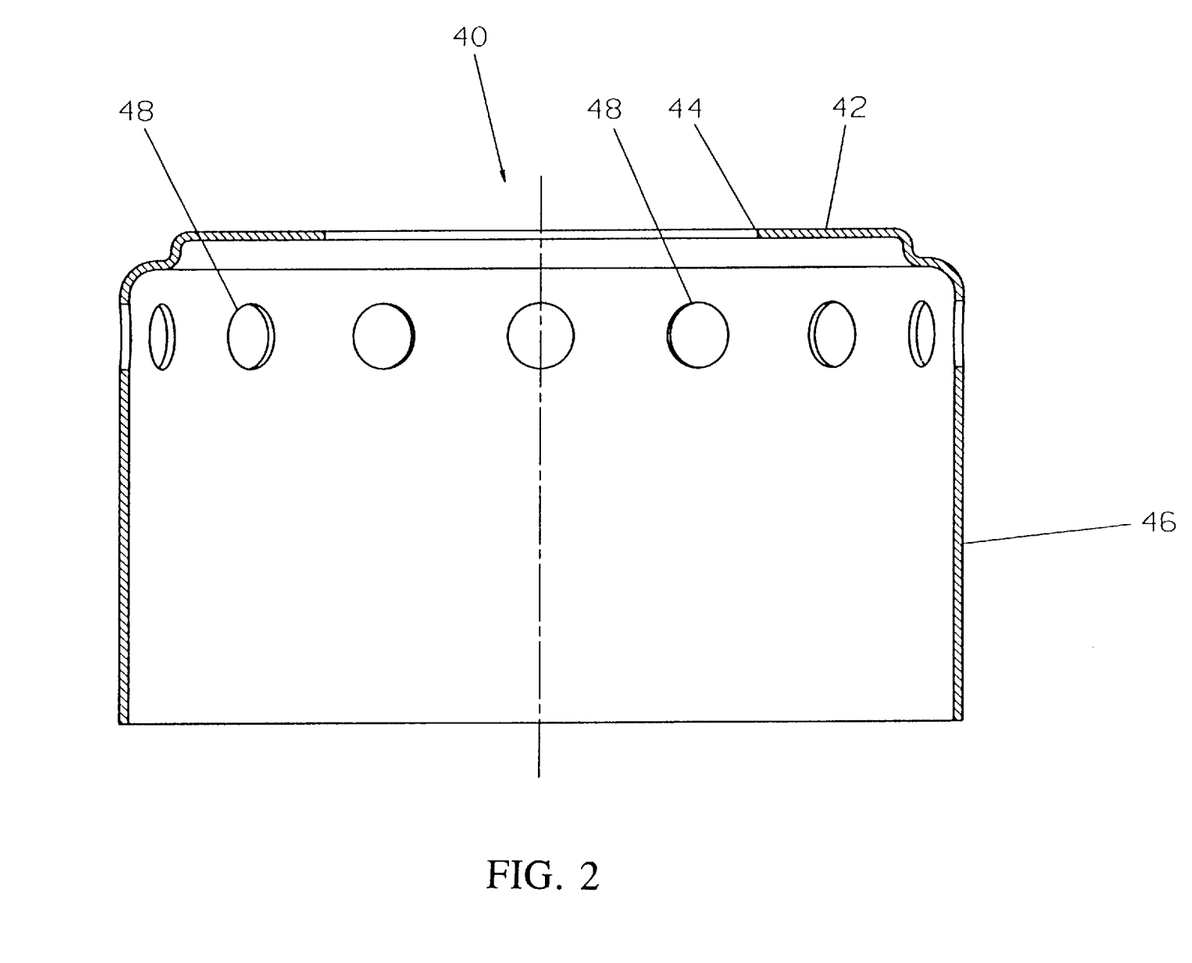
FIG. 2 illustrates a cross-sectional view of a diffuser.

Located within the volume 110 is an igniter assembly 130. The igniter assembly includes a base 132 and a squib or initiator 134 of known construction having electric terminals 136 to receive an energization signal from a control unit. The igniter assembly 130 further includes a seal 138 which functions as a gas seal. The base 132 is secured by welding (see weld 140) to the base plate 24. Received about and extending from the base 132 is a thin-walled generant housing 142 typically fabricated of aluminum. The housing 142 is crimped to the base 132 at a grooved interface 144. Situated within the housing 142 and about the squib 134 is a quantity of fast-burning propellant 150 such as a granular mix of guanidine nitrate and potassium chlorate.

Figure 5:
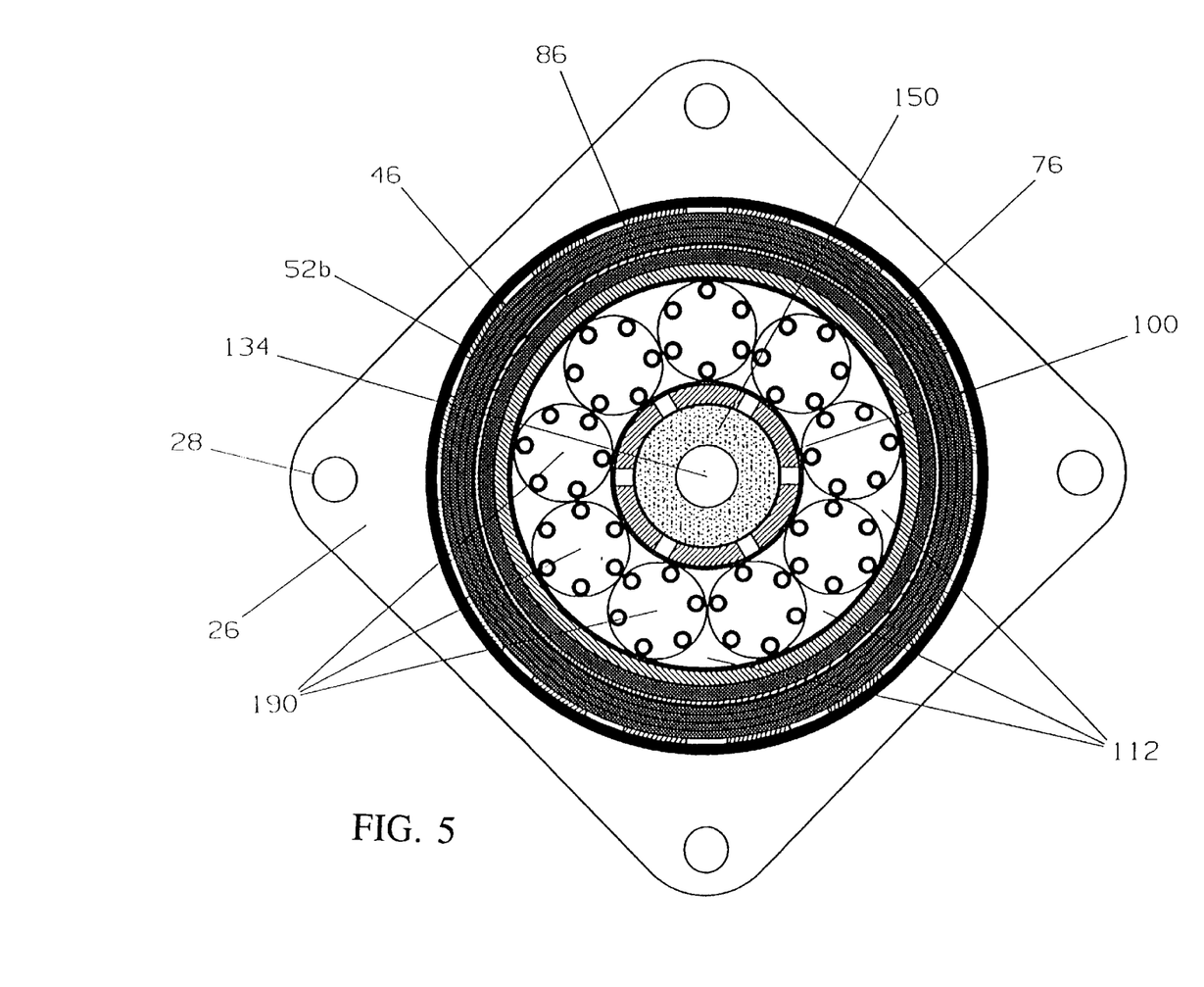
FIG. 5 illustrates a cross-sectional view taken through 5—5 of FIG. 1.
Figure 6:
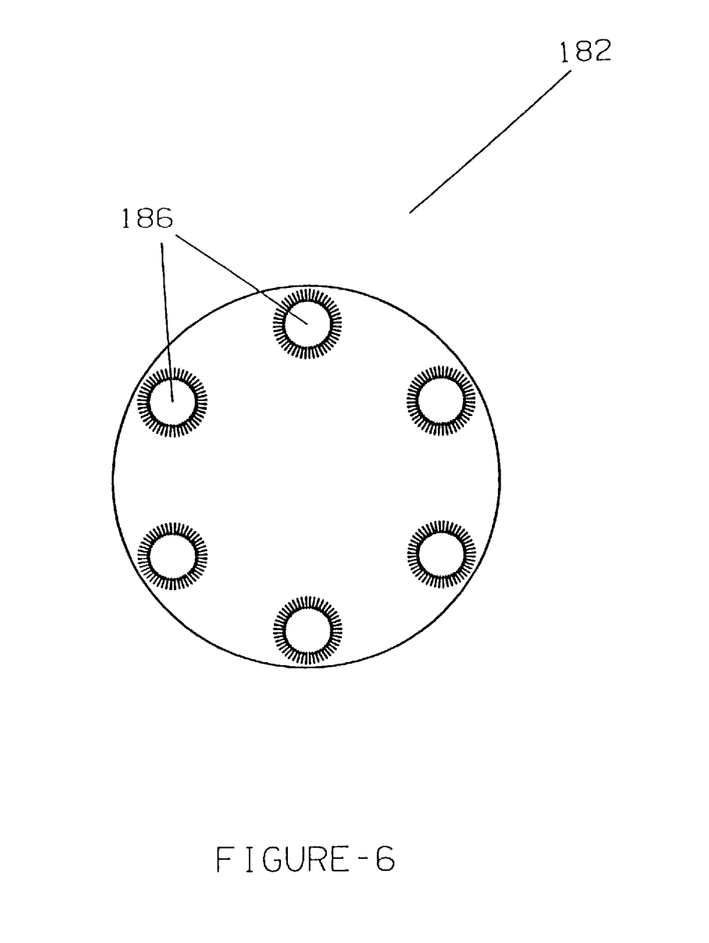
FIGS. 6 and 7 illustrate views of a tablet of combustion material.
Figure 7:
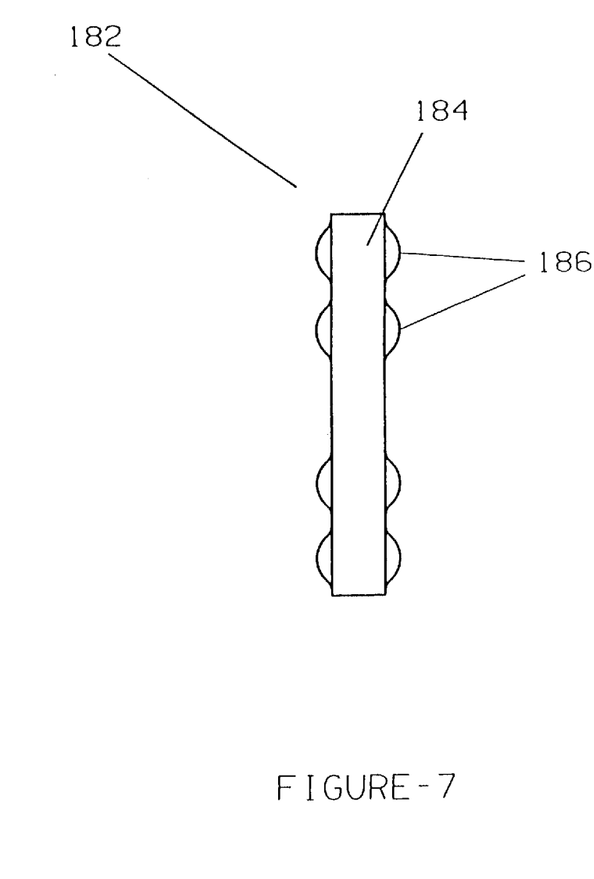

Situated within the annular volume (combustion chamber) 112 is a quantity of gas generating propellant 180. While many different formulations can be used, one that provides a virtually smokeless inflation gas is one comprising guanidine nitrate and potassium perchlorate. This propellant is formed into a plurality of circular tablets 182. Each tablet includes a thin body 184 having a plurality of nubs or bumps 186 on its top and bottom surfaces. A plurality of tablets such as 182 are stacked randomly in layers forming a gas generant charge. These layers or stacks 190 are illustrated in FIG. 1. These layers are positioned within the chamber 112 as illustrated in FIG. 5. The number of tablets 182 in each layer 190 will vary depending upon the quantity of inflation gas and the rate of inflation gas generation needed to fill a specified air bag.

Figure 8:
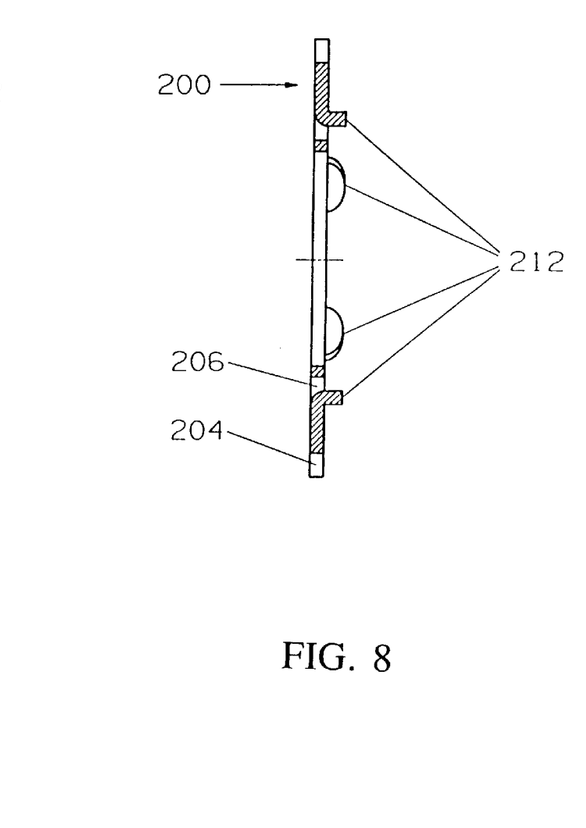
FIGS. 8 and 9 illustrate a top plan view of an isolated grain trap.
Figure 9:
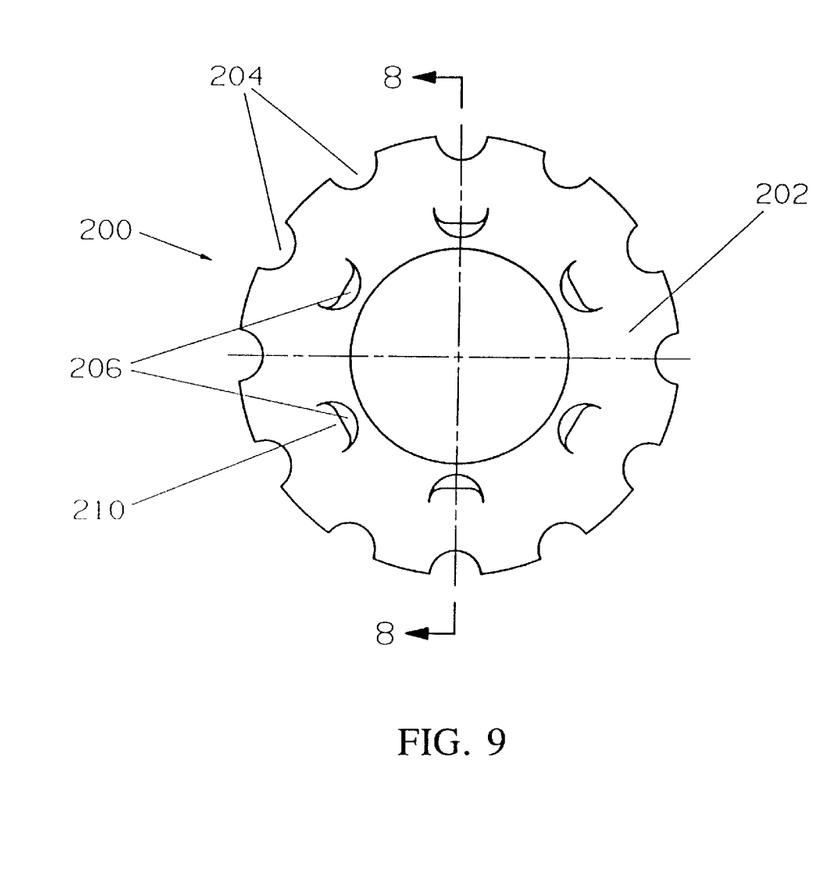
Figure 10:
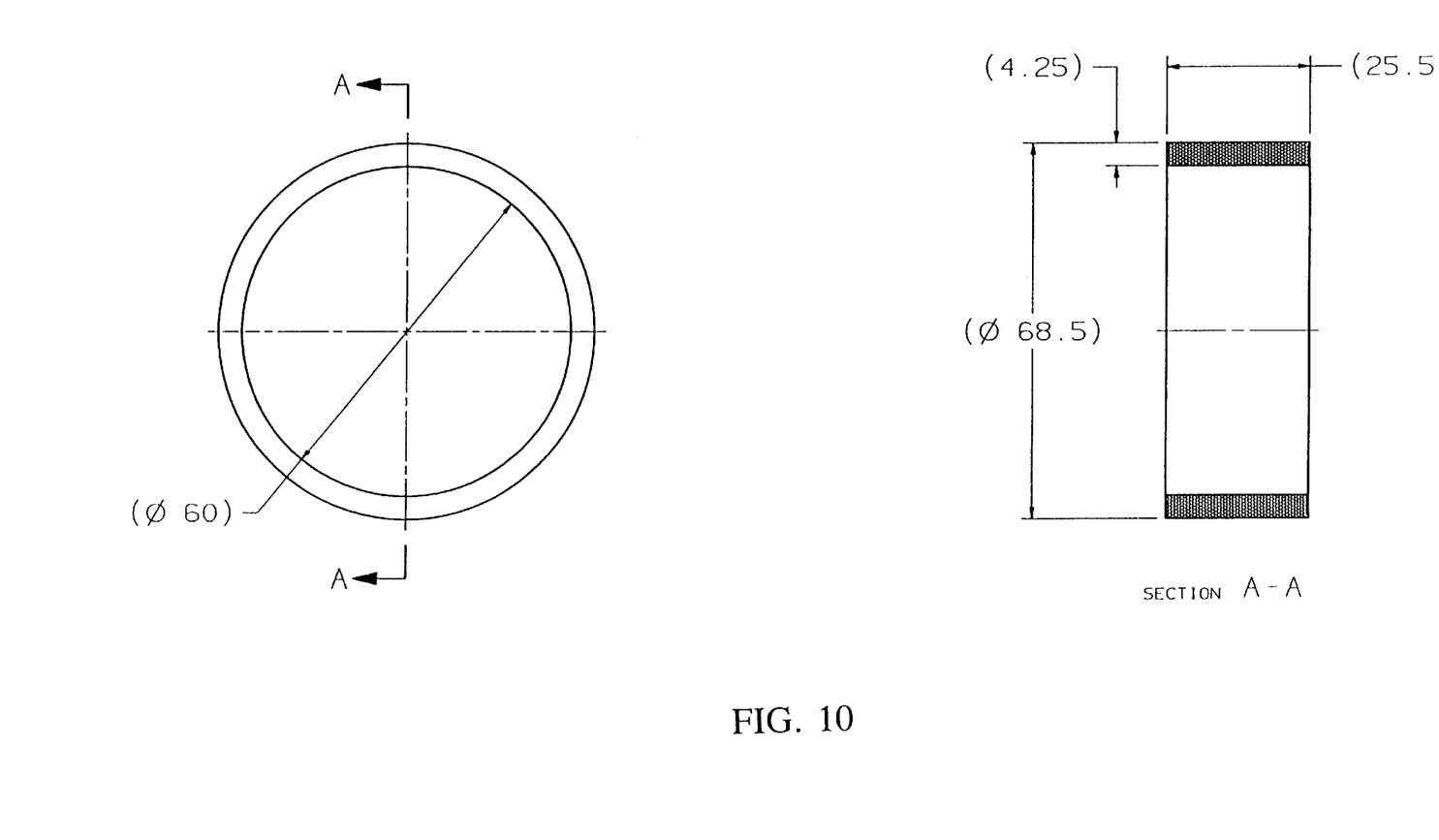
FIG. 10 is cross-sectional view of a filter element.

Loosely received about the exterior walls of tube 100 and positioned upon the top-most tablet 182 of each stack 190 is a grain trap 200. The grain trap is also illustrated in FIG. 8. The grain trap 200 comprises a flat steel plate 202 having a plurality of openings 204 and 206 distributed thereabout through which the inflation gas flows on its way out of the inflator 20. A portion of the plate 210 proximate each opening 206 is bent upwardly to provide a plurality of stand-offs 212 (see FIG. 1). The purpose of the grain trap is to prevent the propellant 180 from impeding the flow of the inflation gas through the openings 90. As the pressure in the combustion chamber 112 rises, the grain trap may be pushed (floats) upwardly, however, the stand-offs 212 will engage the top 82 positioning the grain trap firmly against the interior of the top 82 in a manner that any larger parts of the propellant 180 are impeded from blocking the openings 90. Situated between the wall 86 of housing member 80 is a first filtering element 230 that may be formed of an annular ring comprising a plurality of layers of expanded metal as shown in FIG. 10 or other filter material such as steel wool, or Metex (which is a die formed filter media made from crushed wire). The filter media will also cause a pressure and temperature drop as the inflation gas passes over the media. A material with a weight of between 10 grams and 170 grams can be used for this purpose causing a pressure drop of between 0.2 and 20 inches of water at 750 cubic feet per minute air flow. The filter media can be fabricated from single thickness materials or laminated from several layers of expanded metal or wire product.

Situated between the flow diverter 70 and the wall 46 of the diffuser is another annular filter 232. Either of the filters 230 or 234 can be made of expanded metal or Metex. The lower portion 235 of the filtering element 230 is spaced from the lower end 79 of flow diverter. The filtering element 234 extends from the base plate 24 through to the top of shoulder 64.

As can be seen from FIG. 1 and FIG. 5 the grain trap 200 is spaced from the housing member 80. This space defines an annular plenum 112 (also referred to as chamber 112). Situated about the angled wall 88 of housing 80 is a circular annular plenum. The exposed annular flow area (i.e. the circular plenum) generally shown by numeral 260 is chosen to be at least twice as large as the total flow area through each of the nozzles 90.

Upon the burning of the propellant 180 (the propellant tablets 182) a defined quantity of nitrogen and potassium chloride gas is produced which exits the control nozzles 90. The temperature of this gas just downstream of the nozzles 90 can approach 2000 degrees C. At this temperature the potassium chloride will remain in a gaseous state. The inflation gas exits the nozzles 90 and enters the plenum 260 and is then redirected by the wall 76 of the flow diverter to flow downwardly, generally parallel to the layers of the element 230, i.e. the expanded metal filter rings. The process of turning the gas flow in an abrupt manner acts to deposit solid and liquid material by changes in momentum. The thermal mass of the element 230, in combination with the mass of the flow diverter, functions as a heat sink to reduce the temperature of the inflation gas below the temperature at which the potassium chloride will change to a liquid state. The now liquid potassium chloride will solidify and plate out along the surfaces of the element 230 and also plate out and accumulate in the chamber 250 below the end 79 of the flow diverter as the inflation gas is turned 180 degrees prior to exiting the passages 30. Any remaining quantities of liquefied potassium chloride will also plate out on the lower portions of the element 232 which will also serve to further reduce the temperature of the exiting inflation gas.

Many changes and modifications in the above described embodiment of the invention can, of course, be carried out without departing from the scope thereof. Accordingly, that scope is intended to be limited only by the scope of the appended claims.

I claim:

1. An inflator (20) having a body (22) including a first combustion chamber (110) and a second combustion chamber (112) and a plurality of exit orifices (90); a quantity of first propellant (150) within the first combustion chamber and a quantity of second propellant (180) within the second combustion chamber (112), the second propellant producing inflation gas as it combusts;

separating means (100) for separating the first and second combustion chambers and for directing products of combustion produced upon the burning of the first propellant radially into the second combustion chamber;

the body (22) proximate the second combustion chamber (112) including a plurality of control orifices (90);

flow diverter means (70) for causing inflation gas to abruptly change its flow direction between the control orifices and the exit orifices (30);

heat sink means (230) and (234) for changing the physical state of at least one gaseous component of the inflation gas to a liquid and a solid prior to this component exiting the exit orifices.

2. The device as defined in claim 1 wherein the control orifices are oriented at forty-five degrees to a central axis of the body.

3. The device as defined in claim 2 wherein prior to the combustion of the second propellant the control orifices (90) are blocked.

4. The device as defined in claim 3 wherein the control orifices are blocked by a thin seal attached to the body (22) about the orifices.

5. The device as defined in claim 2 wherein the second propellant comprises guanidine nitrate and potassium perchlorate and wherein one of the products of combustion includes gaseous potassium chloride.

6. The device as defined in claim 2 including a grain trap means located upon the second propellant for preventing portions of the second propellant from clogging any of the control orifices (90).

7. The device as defined in claim 1 wherein the heat sink means has a mass within the range of 1 to 70 grams.

8. The device as defined in claim 7 wherein the heat sink means causes a pressure drop of about 0.2 to 20 inches of water at about a flow rate of the inflation gas of 750 cubic feet per minute.

9. The device as defined in claim 1 including a plenum about the control orifices.

10. The device as defined in claim 9 wherein the flow area through the plenum is greater than or equal to the total flow area of the exit orifices.

11. An inflator (20) having a body (22) including a first combustion chamber (110) and a second combustion chamber (112) and a plurality of exit orifices (90); a quantity of first propellant (150) within the first combustion chamber and a quantity of second propellant (180) with the second combustion chamber (112), the second propellant producing inflation gas as it combusts;

separating means (100) for separating the first and second combustion chambers and for directing products of combustion produced upon the burning of the first propellant radially into the second combustion chamber;

the body (22) proximate the second combustion chamber (112) including a plurality of control orifices (90);

flow diverter means (70) for causing inflation gas exiting the control orifices to flow through an arcuate path between the control orifices and the exit orifices (30);

heat sink means (230) and (234) for changing the physical state of at least one gaseous component of the inflation gas to a liquid and a solid prior to this component exiting the exit orifices.

\* \* \* \* \*